(12) United States Patent
Ulloa Espinosa et al.

(10) Patent No.: US 11,913,529 B2
(45) Date of Patent: Feb. 27, 2024

(54) ELECTRONIC CONTROLLED DOUBLE PENDULUM ASSEMBLY TO SPIN A SHAFT

(71) Applicants: Carolina Elizabeth Ulloa Espinosa, Quito (EC); Max Valentin Ulloa Reinoso, Quito (EC)

(72) Inventors: Carolina Elizabeth Ulloa Espinosa, Quito (EC); Max Valentin Ulloa Reinoso, Quito (EC)

(*) Notice: Subject to any disclaimer, the term of this patent is extended or adjusted under 35 U.S.C. 154(b) by 79 days.

(21) Appl. No.: 17/681,481

(22) Filed: Feb. 25, 2022

(65) Prior Publication Data

US 2022/0290747 A1    Sep. 15, 2022

Related U.S. Application Data

(60) Provisional application No. 63/161,364, filed on Mar. 15, 2021.

(51) Int. Cl.
    *F03G 3/06*    (2006.01)
    *F03G 7/10*    (2006.01)
    *F16H 37/12*   (2006.01)

(52) U.S. Cl.
    CPC .......... *F16H 37/122* (2013.01); *F03G 3/06* (2013.01); *F03G 7/104* (2021.08)

(58) Field of Classification Search
    CPC ... F03G 3/06; F03G 3/087; F03G 7/10; F03G 7/104; F16H 37/122
    See application file for complete search history.

(56) References Cited

U.S. PATENT DOCUMENTS

| | | | | |
|---|---|---|---|---|
| 2012/0292133 | A1* | 11/2012 | Hu | F03G 7/10 |
| | | | | 74/DIG. 9 |
| 2017/0226991 | A1* | 8/2017 | Hardy | F03G 3/06 |
| 2017/0298910 | A1* | 10/2017 | Granger | F03G 3/06 |
| 2018/0119679 | A1* | 5/2018 | Wu | H02K 7/1807 |

FOREIGN PATENT DOCUMENTS

| | | | | |
|---|---|---|---|---|
| JP | 2002346016 A | * 12/2002 | | |
| WO | WO-2005024227 A1 | * 3/2005 | | F03G 3/06 |
| WO | WO-2008077164 A1 | * 7/2008 | | F03G 7/10 |

* cited by examiner

*Primary Examiner* — Phillip A Johnson

(57) ABSTRACT

The double pendulum in dynamic motion generates chaotic movement. The current invention integrates two double pendulums with electronic controllers to control the chaotic movement, and a transmission set to use the controlled motion to spin a shaft. The electronic controller provides impulse to each double pendulum and controls the frequency of the oscillations to generate a constant swinging bi-directional motion of the double pendulums. The upper ends of the double pendulums are coupled to a reciprocating transmission set that transforms the swinging bi-directional motion of each double pendulum into a unidirectional spinning motion, transmitted to a horizontal shaft, generating a constant speed as output.

4 Claims, 1 Drawing Sheet

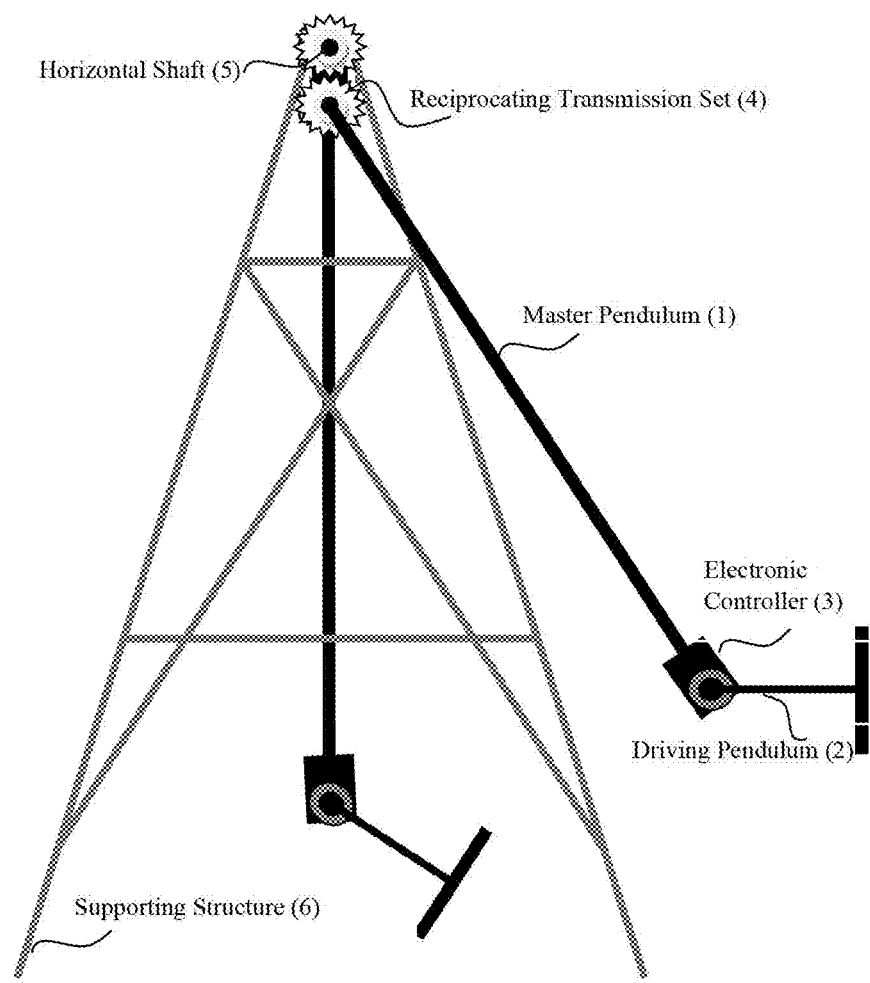

ELECTRONIC CONTROLLED DOUBLE PENDULUM ASSEMBLY TO SPIN A SHAFT

CROSS-REFERENCE TO RELATED APPLICATION

This application claims the benefit of U.S. Provisional Patent Application No. 63/161,364, filed Mar. 15, 2021.

FIELD OF THE INVENTION

The invention describes a method to control the chaotic oscillation of an assembly of at least two double pendulums through electronic controllers, coupled with a reciprocating transmission set to spin a horizontal shaft.

BACKGROUND OF THE INVENTION

The pendulum is one of the oldest human-made machines and has a great number of practical applications. In its basic form, a simple pendulum is a mechanism composed of a pendular rod with a fixed upper end, and a free-moving lower end that can swing freely in pendular motion. A double pendulum couples a second pendulum rod to the lower end of the single pendulum.

The double pendulum in free dynamic motion exhibits chaotic movement, generating a series of random oscillations resulting from the gravitational interaction between the two pendulums. This chaotic movement generates a considerable amount of kinetic energy.

The chaotic motion of the double pendulum can be controlled through an electronic device. The controlled motion of the double pendulum can be used to spin a shaft by connecting the shaft to the fixed end of the pendulum rod through a transmission set, thus providing a constant low-speed motion similar to that of wind turbines.

SUMMARY OF THE INVENTION

The double pendulum assembly is described as one pendulum with a second pendulum attached to its moving lower end. In free dynamic motion, the double pendulum generates chaotic movement. The current invention describes the assembly and a method to control the chaotic oscillation of a set of two double pendulums, by means of electronic controllers attached to each double pendulum. Through the electronic controller, the movement of the double pendulum is limited to a swinging bi-directional movement. The fixed upper end of the electronic controlled double pendulum is coupled to a reciprocating transmission set, that spins a horizontal shaft.

BRIEF DESCRIPTION OF THE DRAWINGS

FIG. 1 is a schematic front view of the assembly composed of two double pendulums, their electronic controllers, transmission set, and horizontal shaft.

DETAILED DESCRIPTION OF THE INVENTION

Each double pendulum system is made up of three main elements. First, the double pendulum composed of a master pendulum (1) and a driving pendulum (2). Second, an electronic controller (3). Third, a transmission set (4) coupled to the upper end of the master pendulum (1) and a horizontal shaft (5).

The first double pendulum is set in vertical position and is composed of the master pendulum (1) and a driving pendulum (2). The master pendulum (1) has a fixed upper end, and a lower end which is free to move. The lower end of the master pendulum (1) is coupled to the upper end of the driving pendulum (2) and to the electronic controller (3). The lower end of the driving pendulum (2) is free to move. The second double pendulum is set vertically with an offset of 60 degrees from the first double pendulum. To increase the gravitational effect, each pendulum has coupled a specific mass.

The electronic controller (3) is composed of, but not limited to, an electric motor, a mechanical brake, an electronic control unit and a position sensor. The electronic controller (3) is designed to provide the impulse to the driving pendulum (2), and to control the frequency of the movement to generate a constant oscillation of the driving pendulum (2). The impulse it provides is calculated and determined to compensate for the natural dampening effect of friction losses on the oscillation. The electronic controller (3) is powered by an external electric supply or battery.

The operation mode is as follows. The electronic controller (3) generates an impulse that sets in motion the first driving pendulum (2). The driving pendulum (2) moves in a swinging bi-directional motion. The motion generated by the driving pendulum (2) drags and provides impulse to the master pendulum (1). In a similar fashion, the master pendulum (1) also moves in a swinging bi-directional motion. The second double pendulum makes the same movement with a delay of 60 degrees approximately.

Based on the position and movement of the driving pendulum (2), the electronic controller (3) provides additional impulse to compensate for losses and controls the frequency of the motion of the driving pendulum (2) to prevent chaotic movement of the double pendulum assembly. Thus, the movement of the master pendulum (1) is maintained at a constant swinging bi-directional motion. The second double pendulum is controlled in a similar manner.

The two main pendulums (1) are connected at their upper ends to a horizontal output shaft through a transmission set (4). The upper end of the each master pendulum (1) is coupled to a reciprocating transmission set (4) that transforms the swinging bi-directional motion of the master pendulum (1) into a unidirectional spinning motion. The spinning motion is transmitted to a horizontal shaft (5).

The invention claimed is:

1. A device comprising of one or more chaos devices, where each chaos device is defined as one master pendulum with a second pendulum attached to a free-moving end of the one master pendulum, with an electronic controller used to regulate the dynamic motion of each chaos device and thus generate a controlled swinging motion that spins a shaft and harnesses the gravitational force acting on the one or more chaos devices to perform mechanical work.

2. The device of claim 1, wherein each chaos device is comprised of the one master pendulum having a static end attached to the shaft of a motor and the free-moving end connected in series to the second driving pendulum.

3. The device of claim 1, wherein said master pendulum comprises a fixed upper end; a lower end which is free to move; the electronic controller attached to the lower end; and a mass attached to the lower end.

4. The device of claim 1, wherein the second pendulum comprises an upper end attached to the lower end of the master pendulum; a lower end which is free to move; and a mass attached to the lower end.

* * * * *